(12) United States Patent
Takahata et al.

(10) Patent No.: US 9,219,278 B2
(45) Date of Patent: Dec. 22, 2015

(54) NON-AQUEOUS ELECTROLYTE SECONDARY BATTERY AND USE THEREOF

(75) Inventors: Koji Takahata, Toyota (JP); Akihiro Ochiai, Moriguchi (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 44 days.

(21) Appl. No.: 14/352,849

(22) PCT Filed: Oct. 20, 2011

(86) PCT No.: PCT/JP2011/074217
§ 371 (c)(1),
(2), (4) Date: Apr. 18, 2014

(87) PCT Pub. No.: WO2013/057826
PCT Pub. Date: Apr. 25, 2013

(65) Prior Publication Data
US 2014/0255783 A1    Sep. 11, 2014

(51) Int. Cl.
*H01M 4/505* (2010.01)
*H01M 4/525* (2010.01)
*H01M 10/0525* (2010.01)
*H01M 4/587* (2010.01)
*H01M 10/0566* (2010.01)

(52) U.S. Cl.
CPC .............. *H01M 4/505* (2013.01); *H01M 4/525* (2013.01); *H01M 4/587* (2013.01); *H01M 10/0525* (2013.01); *H01M 10/0566* (2013.01); *Y02E 60/122* (2013.01); *Y02T 10/7011* (2013.01)

(58) Field of Classification Search
None
See application file for complete search history.

(56) References Cited

U.S. PATENT DOCUMENTS

| | | | |
|---|---|---|---|
| 6,143,448 A | 11/2000 | Fauteux et al. | |
| 2005/0221182 A1 | 10/2005 | Fujiwara et al. | |
| 2009/0035660 A1 | 2/2009 | Fujihara et al. | |
| 2009/0311599 A1* | 12/2009 | Kawai et al. | 429/217 |
| 2010/0068624 A1 | 3/2010 | Hiratsuka et al. | |
| 2011/0262811 A1 | 10/2011 | Kinoshita et al. | |
| 2012/0244417 A1 | 9/2012 | Takahata et al. | |
| 2012/0321947 A1 | 12/2012 | Goto et al. | |
| 2013/0130117 A1* | 5/2013 | Yamamoto et al. | 429/231.8 |
| 2013/0209888 A1 | 8/2013 | Nagai | |
| 2013/0224586 A1 | 8/2013 | Nagai et al. | |

FOREIGN PATENT DOCUMENTS

| | | |
|---|---|---|
| CN | 101528607 | 9/2009 |
| JP | 10-302774 | 11/1998 |
| JP | 2000-331672 | 11/2000 |
| JP | 2005-285606 | 10/2005 |
| JP | 2006-004811 | 1/2006 |
| JP | 2006-318868 | 11/2006 |

(Continued)

*Primary Examiner* — Gregg Cantelmo
(74) *Attorney, Agent, or Firm* — Finnegan, Henderson, Farabow, Garrett & Dunner, LLP (57) ABSTRACT

The non-aqueous electrolyte secondary battery provided by this invention comprises a positive electrode and a negative electrode, wherein the positive electrode has a positive electrode active material layer comprising a positive electrode active material as a primary component, and the negative electrode has a negative electrode active material layer comprising a negative electrode active material as a primary component, having a negative electrode active material's linseed oil absorption number B (mL/100 g) to positive electrode active material's DBP absorption number A (mL/100 g) ratio B/A of 1.27 to 1.79.

7 Claims, 5 Drawing Sheets

(56) References Cited

FOREIGN PATENT DOCUMENTS

| | | |
|---|---|---|
| JP | 2008-204886 | 9/2008 |
| JP | 2009-037740 | 2/2009 |
| JP | 2009-193805 | 8/2009 |
| JP | 2010-92649 | 4/2010 |
| WO | WO 2011/033707 | 3/2011 |
| WO | WO 2011/036759 | 3/2011 |
| WO | WO 2011/074083 | 6/2011 |
| WO | WO 2012/049778 | 4/2012 |
| WO | WO 2012/049779 | 4/2012 |
| WO | WO 2013/018179 | 2/2013 |

* cited by examiner

NON-AQUEOUS ELECTROLYTE SECONDARY BATTERY AND USE THEREOF

CROSS-REFERENCE TO RELATED APPLICATIONS

This application is a national phase application of International Application No. PCT/JP2011/074217, filed Oct. 20, 2011, the content of which is incorporated herein by reference.

TECHNICAL FIELD

The present invention relates to a non-aqueous electrolyte secondary battery.

BACKGROUND ART

Lately, secondary batteries such as lithium-ion secondary batteries and nickel-hydrogen batteries, etc., have become increasingly important as, for example, power supplies loaded on electrically-driven vehicles, or as power sources loaded on PCs, mobile phones and other electric products, etc. In particular, lightweight lithium-ion secondary batteries with high energy densities are expected to be preferably used as high-power power supplies to be loaded on vehicles. Lithium-ion secondary battery, which is a typical example of such a non-electrolyte secondary battery, comprises electrodes (a positive electrode and a negative electrode) having electrode active material layers (a positive electrode active material layer and a negative electrode active material layer) primarily comprising electrode active materials (a positive electrode active material and a negative electrode active material) capable of reversibly storing and releasing a chemical species (lithium ions) serving as the charge carrier, and uses a non-aqueous electrolyte solution having a composition containing a support salt such as $LiPF_6$ or the like in a non-aqueous solvent such as propylene carbonate, ethylene carbonate, etc. Patent Documents 1 to 4 can be cited as conventional art disclosing oil absorption numbers of positive electrode active materials or negative electrode active materials in such lithium-ion secondary batteries.

CITATION LIST

Patent Literature

[Patent Document 1] Japanese Patent Application Publication No. 2005-285606
[Patent Document 2] Japanese Patent Application Publication No. 2000-331672
[Patent Document 3] Japanese Patent Application Publication No. 2010-92649
[Patent Document 4] Japanese Patent Application Publication No. H10-302774

SUMMARY OF INVENTION

Some applications of nonaqueous electrolyte secondary batteries presumably involve use in an embodiment where high-rate discharge (rapid discharge) is repeated. A typical example of non-aqueous electrolyte secondary batteries that may be used in such an embodiment is a non-aqueous electrolyte battery used as a driving power supply in vehicles (e.g. a lithium-ion secondary battery loaded on a hybrid vehicle that employs, as the driving power supplies, a lithium-ion secondary battery combined with another power supply that works on different principle such as an internal combustion engine, etc.). It has been known, however, that conventional general non-aqueous electrolyte secondary batteries are susceptible to performance degradation upon charge/discharge cycling involving high-rate discharge even if exhibiting relatively high durability against low-rate charge/discharge cycling. One of the reasons may be an increase in internal resistance caused by high-rate charge/discharge cycling.

The present invention was thus made to solve the conventional problem described above, and an objective thereof is to provide a non-aqueous electrolyte secondary battery in which the resistance increase caused by repeated charging and discharging is suppressed. Another objective is to provide a vehicle comprising a non-aqueous electrolyte secondary battery having such properties.

To realize the objectives, the present invention provides a non-aqueous electrolyte secondary battery comprising a positive electrode and a negative electrode wherein the positive electrode has a positive electrode active material layer comprising a positive electrode active material as a primary component while the negative electrode has a negative electrode active material layer comprising a negative electrode active material as a primary component, with the non-aqueous electrolyte secondary battery being characterized by having a negative electrode active material's linseed oil absorption number B (mL/100 g) to positive electrode active material's DBP absorption number A (mL/100 g) ratio B/A of 1.27 to 1.79.

Upon earnest investigations to determine what caused the increase in resistance during high-rate discharge cycling, the present inventors inferred that repeated high-rate discharge made it difficult for the non-aqueous electrolyte solution at a high support salt concentration to enter the positive and negative electrodes and made the concentration of support salt in the non-aqueous electrolyte solution comparatively lower inside the positive and negative electrodes, resulting in a variance of the support salt concentration inside and outside the positive and negative electrodes, which in turn possibly caused the resistance increase in the non-aqueous electrolyte secondary battery. Thus, further studies were carried out to minimize the variance of the support salt concentration in the non-aqueous electrolyte solution inside and outside the positive and negative electrodes; and as a result, it was found that the affinity among the positive electrode active material, the negative electrode active material and the non-aqueous electrolyte solution (e.g. the tendency of the non-aqueous electrolyte solution to enter the positive and negative electrode active material layers) satisfies a certain relationship, the resistance increase caused by repeated high-rate discharge could be suppressed; and the present invention was completed. That is, in the present invention, as an index of affinity among positive electrode active material, negative electrode active material and non-aqueous electrolyte solution, oil absorption numbers (dibutyl phthalate (DBP) absorption number and linseed oil absorption number) are used; and by selecting and using a positive electrode active material and a negative electrode active material so as to have a negative electrode active material's linseed oil absorption number B (mL/100 g) to positive electrode active material's DBP absorption number A (mL/100 g) ratio, B/A, in a range of 1.27 to 1.79 (preferably 1.53 to 1.73, the resistance increase caused by repeated charging and discharging (typically an increase in internal resistance occurring when high-rate discharge is repeated) can be suppressed in the resulting non-aqueous electrolyte secondary battery. Thus, the present invention can provide a lithium-ion secondary battery and other non-aqueous electrolyte secondary battery in which the resistance increase caused by repeated charging and discharging is suppressed.

In a preferable embodiment of the non-aqueous electrolyte secondary battery disclosed herein, the DBP absorption number A of the positive electrode active material is 25 mL/100 g or greater. With the DBP absorption number A of the positive electrode active material being a prescribed value or greater, as long as the affinity between the positive electrode active material and the non-aqueous electrolyte solution satisfies a suitable relative relationship with the affinity between the negative electrode active material and the non-aqueous electrolyte solution, the affinity between the positive electrode active material and the non-aqueous electrolyte solution will further increase, resulting in preferable suppression of the resistance increase caused by repeated charging and discharging (typically an increase in internal resistance in the non-aqueous electrolyte secondary battery occurring when high-rate discharge is repeated).

In a preferable embodiment of the non-aqueous electrolyte secondary battery disclosed herein, the linseed oil absorption number B of the negative electrode active material is 45 mL/100 g or greater. With the linseed oil absorption number B of the negative electrode active material being a prescribed value or greater, as long as the affinity between the positive electrode active material and the non-aqueous electrolyte solution satisfies a suitable relationship with the affinity between the negative electrode active material and the non-aqueous electrolyte solution, the affinity between the negative electrode active material and the non-aqueous electrolyte solution will further increase, resulting in preferable suppression of the resistance increase caused by repeated charging and discharging (typically an increase in internal resistance of the non-aqueous electrolyte secondary battery occurring when high-rate discharge is repeated).

In a preferable embodiment of the non-aqueous electrolyte secondary battery disclosed herein, the DBP absorption number A (mL/100 g) of the positive electrode active material and the linseed oil absorption number B (mL/100 g) of the negative electrode active material add to a total A+B of 87 (mL/200 g) or greater. With the total of the oil absorptions of the positive electrode active material and the negative electrode active material being a prescribed value or greater, as long as the affinity between the positive electrode active material and the non-aqueous electrolyte solution satisfies a suitable relative relationship with the affinity between the negative electrode active material and the non-aqueous electrolyte solution, the affinity among the positive electrode active material, the negative electrode active material and the non-aqueous electrolyte solution will further increase, resulting in preferable suppression of the resistance increase caused by repeated charging and discharging (typically an increase in internal resistance of the non-aqueous electrolyte secondary battery occurring when high-rate discharge is repeated).

In a preferable embodiment of the non-aqueous electrolyte secondary battery disclosed herein, the battery being constructed as a lithium-ion secondary battery, wherein the positive electrode active material is a lithium transition metal oxide comprising, as a constituent atom, at least one species of nickel, cobalt and manganese, and the negative electrode active material is graphite. By selecting a positive electrode active material and a negative electrode active material in such a way, the resistance increase caused by repeated charging and discharging, especially the internal resistance increase of the lithium-ion secondary battery occurring when high-rate discharge is repeated, can be preferably suppressed.

The present invention further provides a vehicle comprising a non-aqueous electrolyte secondary battery disclosed herein. Since the resistance increase (typically an internal resistance increase in the non-electrolyte secondary battery occurring when high-rate discharge is repeated) is suppressed in such a non-aqueous electrolyte secondary battery, it can be preferably used as a power supply for a motor (electric motor) loaded on vehicles such as automobiles comprising electric motors, including hybrid automobiles, electric automobiles, and fuel-cell automobiles; and the like

EMBODIMENTS OF INVENTION

While referring to drawings, an embodiment of the present invention is described below. The dimensional relationships (of length, width, thickness, etc.) in each drawing do not represent actual dimensional relationships. Matters (e.g. constitution and manufacturing process of the electrode body comprising the positive electrode and the negative electrode, constitutions and manufacturing processes of the separator and the electrolyte solution, the shape, etc., of the battery (battery case), general techniques related to construction of the battery, etc.) necessary to practice this invention other than those specifically referred to in this description may be understood as design matters based on the conventional art in the pertinent field to a person of ordinary skills in the art.

A preferable embodiment of the non-aqueous electrolyte secondary battery disclosed herein is described with an example of a lithium-ion secondary battery while the application of the present invention is not to be limited to such a battery. For example, the present invention can be applied to a non-aqueous electrolyte secondary battery using other metal ions (e.g. sodium ions) instead of lithium ions as the charge carrier. The term "secondary battery" in the present description refers to a battery capable of charging and discharging repeatedly in general, and includes storage batteries (i.e. chemical cells) such as lithium-ion secondary batteries and the like as well as capacitors (i.e. physical cells) such as electric double-layer capacitors and the like. The term "lithium-ion secondary battery" in the present description refers to a secondary battery that uses lithium ions as electrolyte ions, and is charged and discharged by charge transfer associated with lithium ions between the positive and negative electrodes.

Figure 1:
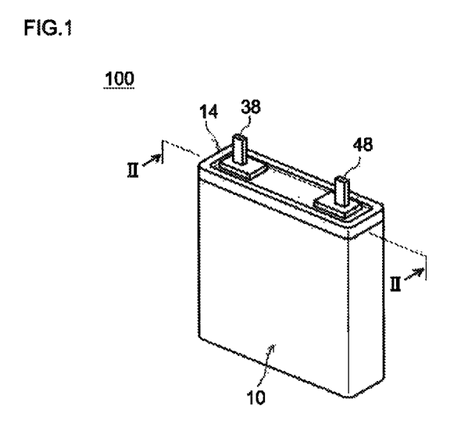
FIG. 1 shows a perspective view schematically illustrating a lithium-ion secondary battery according to an embodiment.
Figure 2:
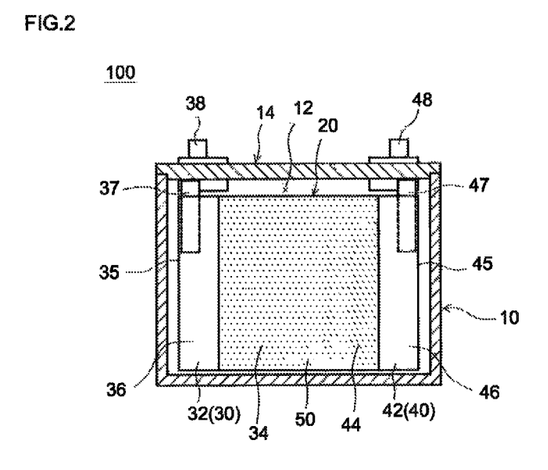
FIG. 2 shows a cross-sectional view taken along line II-II in FIG. 1.

As shown in FIG. 1 and FIG. 2, lithium-ion secondary battery 100 according to an embodiment can have a constitution similar to conventional batteries, comprising, for instance, a square battery case 10 and a lid 14 closing an opening 12 of the battery case 10. Via the opening 12, a flat electrode body (wound electrode body 20) and a non-aqueous electrolyte solution can be placed in the battery case 10. The lid 14 is provided with an external positive current-collecting terminal 38 and an external negative current-collecting terminal 48 for connections to the outside, with these terminals 38 and 48 partially extending out from the surface of the lid 14. Portions of external positive current-collecting terminal 38 and external negative current-collecting terminal 48 are joined to an internal positive terminal 37 and an internal negative terminal 47 in the case, respectively.

Figure 3:
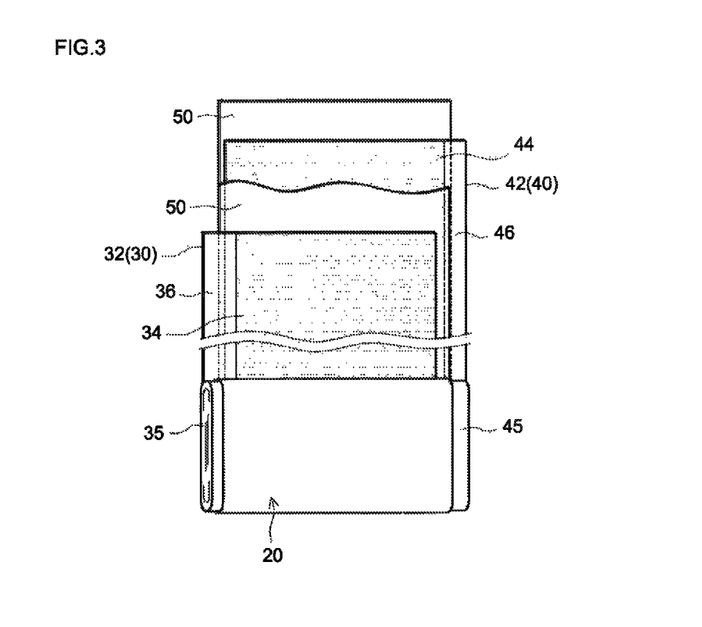
FIG. 3 shows a perspective view schematically illustrating a state of the electrode body according to an embodiment being fabricated by winding.

As shown in FIG. 3, wound electrode body 20 is constituted with a positive electrode sheet 30 in a sheet form where a positive electrode active material layer 34 is formed on a surface of a long strip of positive electrode current collector 32, long sheets of separator 50, and a negative electrode sheet 40 in a sheet form where a negative electrode active material layer 44 is formed on a surface of a long strip of negative current collector 42. Positive electrode sheet 30 and negative electrode sheet 40 are layered via two separator sheets 50 in order of positive electrode sheet 30, separator sheet 50, negative electrode sheet 40 and separator sheet 50. The layered body is wound in a roll around an axial core (not shown in the drawing), and the resulting wound electrode body 20 is laterally compressed and squashed to form a flat shape.

In the middle part of the width direction relative to the winding direction of wound electrode body 20, there is formed a portion where the positive electrode active material layer 34 formed on the surface of positive current collector 32 and the negative electrode active material layer 44 formed on the surface of negative current collector 42 are densely overlaid on top of each other. An edge across the width direction relative to the winding direction is configured to have a portion (positive electrode active material layer-free portion 36) exposing positive current collector 32 without any positive electrode active material layer 34 formed thereon, with the portion being layered while hanging off separator sheets 50 and negative electrode sheet 40 (or the portion having densely overlaid positive electrode active material layer 34 and negative electrode active material layer 44). In other words, on the edge of wound electrode body 20, a positive electrode active material layer-free portion 36 in the positive current collector is layered to form positive current collector-layered region 35. The other edge of wound electrode body 20 has a configuration similar to that of the positive electrode sheet 30, where a negative electrode active material layer-free portion 46 in the negative current collector 42 is layered to form negative current collector-layered region 45. Separator sheets 50 used herein have a width larger than the width of the overlaid portion of positive electrode active material layer 34 and negative electrode active material layer 44, but smaller than the width of the wound electrode body 20; and to prevent a short circuit associated with direct contact between positive current collector 32 and negative current collector 42, they are placed so as to be present between the layers of overlaid positive electrode active material layer 34 and negative electrode active material layer 44.

The positive electrode (typically a positive electrode sheet 30) in the lithium-ion secondary battery has a constitution where positive electrode active material layer 34 comprising a positive electrode active material is formed on a long strip of positive current collector 32. As the positive current collector 32, can be preferably used a conductive material formed of a metal having good conductivity. For example, can be used aluminum or an alloy containing aluminum as the primary component. The shape of current collector 32 is not particularly limited as it may vary depending on the shape, etc., of the lithium-ion secondary battery, and may have a variety of shapes such as a rod, plate, sheet, foil, mesh, and so on.

The positive electrode active material constituting positive electrode active material layer 34 is not particularly limited with respect to the composition or the form, as long as the positive electrode active material can satisfy to have a negative electrode active material's linseed oil absorption number B (mL/100 g) to positive electrode active material's DBP absorption number A (mL/100 g) ratio, B/A, described later of 1.27 to 1.79. Typical positive electrode active materials include a composite oxide comprising lithium and at least one species of transition metal (preferably at least one species among nickel, cobalt and manganese). For example, it is preferable to use a so-called lithium-containing mono-component composite oxide containing a single species of transition metal such as lithium cobalt composite oxide ($LiCoO_2$), lithium nickel composite oxide ($LiNiO_2$), lithium manganese composite oxide ($LiMn_2O_4$) and the like; a so-called lithium-containing bi-component composite oxide containing two species of transition metal, such as one represented by a nickel/cobalt-based $LiNi_xCo_{1-x}O_2$ ($0<x<1$), cobalt/manganese-based $LiCo_xMn_{1-x}O_2$ ($0<x<1$) and nickel/manganese-based $LiNi_xMn_{1-x}O_2$ ($0<x<1$) and $LiNi_xMn_{2-x}O_4$ ($0<x<2$); a lithium-containing tri-component transition metal oxide comprising nickel, cobalt and manganese as transition metals, such as one represented by a general formula: $Li(Li_aMn_xCo_yNi_z)O_2$ (in the formula, a, x, y, z are real numbers that satisfy $a+x+y+z=1$); or a so-called solid solution-type lithium excess transition metal oxide such as one represented by a general formula: $xLi[Li_{1/3}Mn_{2/3}]O_2 \cdot (1-x)LiMeO_2$ (in the formula, Me is one, two or more species of transition metal, and x satisfies $0<x\leq1$); or the like. In particular, a tri-component lithium transition metal oxide comprising nickel, cobalt and manganese as transition metals is more preferable.

As the positive electrode active material, it is also preferable to use a polyanion-based compound represented by a general formula $LiMAO_4$ (herein, M is at least one species of metal selected from a group consisting of Fe, Co, Ni and Mn while A is an atom selected from a group consisting of P, Si, S and V). Examples of particularly preferable polyanion-based compounds include those with A in the general formula being P and/or Si (e.g. $LiFePO_4$, $LiFeSiO_4$, $LiCoPO_4$, $LiCoSiO_4$, $LiFe_{0.5}Co_{0.5}PO_4$, $LiFe_{0.5}Co_{0.5}SiO_4$, $LiMnPO_4$, $LiMnSiO_4$, $LiNiPO_4$, $LNiSiO_4$).

The DBP absorption number A of the positive electrode active material as described above is not particularly limited, as long as it can satisfy to have a negative electrode active material's linseed oil absorption number B (mL/100 g) to positive electrode active material's DBP absorption number A (mL/100 g) ratio, B/A, described later of 1.27 to 1.79. It is preferably 25 mL/100 g or greater (e.g. 30 mL/100 g or greater, typically 34 mL/100 g or greater), but 55 mL/100 g or less (e.g. 50 mL/100 g or less, typically 37 mL/100 g or less). With the DBP absorption number A of the positive electrode active material being within this range, as long as the affinity between the positive electrode active material and the non-aqueous electrolyte solution satisfies a prescribed relative relationship with the affinity between the negative electrode active material and the non-aqueous electrolyte solution, the affinity between the positive electrode active material and the non-aqueous electrolyte solution will further increase, resulting in preferable suppression of the internal resistance increase in the non-aqueous electrolyte secondary battery occurring when high-rate discharge is repeated.

In the present description, the oil absorption of the positive electrode active material is evaluated based on the DBP absorption number. The DBP absorption number is determined based on JIS K6217-4 "Carbon black for rubber industry—Fundamental characteristics—Part 4: Determination of oil absorption number". Herein, as the test liquid, DBP (dibutyl phthalate) is used. Titration is carried out with a constant-rate burette on the subject powder (positive electrode active material), and the change in viscosity is measured by a torque sensor. The DBP absorption number (mL/100 g) is determined as the amount of test liquid added per unit weight of the subject powder corresponding to a torque of 70% of the maximum torque generated. As the measurement device for DBP absorption numbers, for example, an absorption tester available from Asahisouken Co. Ltd. can be used.

A compound constituting such a positive electrode active material can be prepared and provided, for example, by a conventionally-known method. For instance, by mixing some starting materials suitably selected according to the atomic composition at a prescribed molar ratio and calcining the mixture at a prescribed temperature by a suitable means, the oxide can be prepared. The calcined product can be crushed, granulated and sifted by suitable means to obtain granular positive electrode active material powder formed essentially with secondary particles having a desirable average particle diameter and/or particle size distribution. By measuring the DBP absorption number of the resulting positive electrode active material powder based on JIS K6217-4 described above, a suitable positive electrode active material can be selected for constructing a lithium-ion secondary battery according to the present invention.

The amount of the positive electrode active material contained in the positive electrode active material layer is greater than about 50% by mass, or preferably about 70% by mass to 99% by mass (e.g. 70% by mass to 95% by mass, typically 75% by mass to 90% by mass).

The positive electrode active material layer may comprise additives such as one, two or more species of conductive material and binder that can be used in positive electrode active material layers in general lithium-ion secondary batteries, and other additives, etc., as necessary. Preferable conductive materials include conductive material powder such as carbon powder, carbon fibers, and so on. Preferable examples of carbon powder include various kinds of carbon black, such as acetylene black, furnace black, Ketjen black, graphite powder and the like. Alternatively, among conductive fibers such as carbon fibers, metal fibers, etc.; powdered metals such as copper, nickel, etc.; and organic conductive materials such as polyphenylene derivatives, etc.; and the like, solely one species or a mixture of these can be contained.

As the binder, can be suitably used a binder similar to those used in positive electrodes of general lithium-ion secondary batteries. For example, it is preferable to select a polymer soluble or dispersible in the solvent used. When using an aqueous solvent, it is preferable to use a water-soluble or water-dispersible polymer, with examples including cellulose-based polymers such as carboxymethyl cellulose (CMC) and hydroxypropyl methyl cellulose (HPMC), etc.; polyvinyl alcohol (PVA); fluorine-based resins such as polytetrafluoroethylene (PTFE) and tetrafluoroethylene-hexafluoropropylene copolymer (FEP), etc.; vinyl acetate copolymers; rubbers such as styrene butadiene rubber (SBR) and acrylic acid-modified SBR resin (SBR-based latex), etc.; and so on. When using a non-aqueous solvent, it is preferable to use a polymer such as polyvinylidene fluoride (PVDF), polyvinylidene chloride (PVDC), etc. Among these binders, solely one species may be used, or two or more species can be used in combination. The polymer materials exemplified above may also be used to work as a thickener or other additive in the composition, in addition to working as a binder.

The amounts of these additives contained in the positive electrode active material layer are not particularly limited while the amount of the conductive material is preferably about 4% by mass to 25% by mass (e.g. about 9% by mass to 22% by mass) and the amount of the binder etc. is preferably about 1% by mass to 5% by mass (e.g. about 1% by mass to 3% by mass).

The method for fabricating the positive electrode such as one described above is not particularly limited, and conventional methods can be employed. For instance, it can be fabricated by the following methods. Firstly, a positive electrode active material a conductive material and a binder, etc., are mixed with a suitable solvent (an aqueous solvent or a non-aqueous solvent) to prepare a paste-form or slurry positive electrode active material layer-forming composition (or a paste-form composition, hereinafter). The mixing procedure can be carried out, using a suitable mixer (a planetary mixer, homodisper, clearmix, filmix, etc.). As the solvent used for preparation of the paste-form composition, either an aqueous solvent or a non-aqueous solvent can be used. The aqueous solvent should show aqueous properties as a whole, that is, water or a solvent mixture primarily comprising water can be preferably used. Preferable examples of non-aqueous solvents include N-methyl-2-pyrrolidone (NMP), methyl ethyl ketone, toluene, etc. The paste-form composition thus prepared is applied to a positive current collector, allowed to dry by evaporating the solvent, and pressed. As a method for applying the paste-form composition to the positive current collector, can be suitably employed a technique similar to conventionally-known methods. For example, with a suitable applicator such as slit coater, die coater, gravure coater, comma coater, etc., the composition can be preferably applied to the positive current collector. The solvent can be dried off well by employing one or a combination of natural drying, heated air, low-humidity air, vacuum, infrared rays, far-infrared rays and electron beam. As a pressing method, can be employed a compression method such as a conventionally-known roll-pressing method or a flat-press method, etc. To adjust the thickness, the thickness can be measured with a film thickness gauge and compressed several times to a desirable thickness by adjusting the pressure. A positive electrode for the lithium-ion secondary battery can be thus obtained having a positive electrode active material layer formed on a positive current collector.

In the positive electrode fabricated as described above, for example, the basis weight (coating weight based on the solid content in the positive electrode active material layer-forming composition) of the positive electrode active material layer per unit surface area of the positive current collector is not particularly limited as long as sufficient conductive channels (conductive pathways) are obtained. It is preferably 5 mg/cm$^2$ or more (e.g. 7 mg/cm² or more, typically 10 mg/cm² or more), but 100 mg/cm² or less (e.g. 50 mg/cm² or less, typically 25 mg/cm² or less).

The negative electrode (typically a negative electrode sheet 40) has a constitution where negative electrode active material layer 44 comprising a negative electrode active material is formed on a long strip of negative current collector 42. For the negative current collector 42 serving as the substrate of the negative electrode, can be preferably used a conductive material formed of a metal having good conductivity, similarly to conventional lithium-ion secondary batteries. For instance, copper or an alloy containing copper as the primary component can be used. The shape of negative current collector 42 is not particularly limited as it may vary in accordance with the shape, etc., of the lithium-ion secondary battery, and it may have a variety of shapes such as a rod, plate, sheet, foil, mesh, and so on.

The negative electrode active material layer 44 comprises a negative electrode active material capable of storing and releasing lithium ions serving as the charge carrier. The negative electrode active material is not particularly limited with respect to the composition or the form, as long as the negative electrode active material can satisfy to have a negative electrode active material's linseed oil absorption number B (mL/100 g) to positive electrode active material's DBP absorption number A (mL/100 g) ratio, B/A, described later of 1.27 to 1.79. Among substances conventionally used in lithium-ion secondary batteries, one, two or more species can be used. Examples of such negative electrode active materials include carbon materials used in typical lithium-ion secondary batteries. Examples of typical carbon materials used as negative electrode active materials include graphite carbons (graphites) and amorphous carbons, etc. In particular, it is preferable to use a granular carbon material (carbon powder) containing a graphite structure (layered structure) at least partially. Any carbon material among so-called graphitic substances (graphites), hard-to-graphitize carbonaceous substances (hard carbons), easy-to-graphitize carbonaceous substances (soft carbons) and substances having a structure combining these can be preferably used. Among these, use of a carbon material primarily comprising natural graphite (or synthetic graphite) is preferable. Such natural graphite (or synthetic graphite) may be obtained via spheronization of graphite flakes. For example, for the granular graphite comprising the spheronized graphite, it is preferable to have a median diameter (average particle diameter $D_{50}$: 50% volume-average particle diameter) in a range of about 5 µm to 30 µm when determined from a particle size distribution measured with a particle size analyzer based on laser scattering/diffraction. Alternatively, carbonaceous powder obtained by coating surfaces of the graphite with amorphous carbon can be used as well. Other than these, as the negative electrode active material, can also be used an oxide such as lithium titanate (LTO) or the like, a silicon material, a tin material, etc., as a single species, an alloy, a compound, or a composite material combining these materials.

The linseed oil absorption number B of the negative electrode active material as described above is not particularly limited, as long as it can satisfy to have a negative electrode active material's linseed oil absorption number B (mL/100 g) to positive electrode active material's DBP absorption number A (mL/100 g) ratio, B/A, described later of 1.27 to 1.79. It is preferably 45 mL/100 g or greater (e.g. 50 mL/100 g or greater, typically 55 mL/100 g or greater but 100 mL/100 g or less (e.g. 80 mL/100 g or less, typically 75 mL/100 g or less). With the linseed oil absorption number B of the negative electrode active material being within this range, as long as the affinity between the positive electrode active material and the non-aqueous electrolyte solution satisfies a prescribed relative relationship with the affinity between the negative electrode active material and the non-aqueous electrolyte solution, the affinity between the negative electrode active material and the non-aqueous electrolyte solution will further increase, resulting in preferable suppression of the internal resistance increase in the non-aqueous electrolyte secondary battery occurring when high-rate discharge is repeated.

In the present description, the oil absorption of the negative electrode active material is evaluated based on the linseed oil absorption number. The linseed oil absorption number (mL/100 g) can be measured based on the measurement method for the DBP absorption number A of the positive electrode active material, by using linseed oil in place of DBP as the test liquid, carrying out titration with a constant-rate burette on the subject powder and measuring the change in viscosity by a torque sensor. The linseed oil absorption number is determined as the amount of test liquid added per unit weight of the subject powder corresponding to a torque of 70% of the maximum torque generated. By measuring the linseed oil absorption number according to the method described above with respect to the negative electrode active material obtained, a suitable negative electrode active material can be selected for constructing a lithium-ion secondary battery according to the present invention.

The amount of the negative electrode active material contained in the negative electrode active material layer is greater than about 50% by mass, or preferably about 90% by mass to 99% by mass (e.g. 95% by mass to 99% by mass, typically 97% by mass to 99% by mass).

The negative electrode active material layer may comprise additives such as one, two or more species of binder and thickener that can be used in negative electrode active material layers in general lithium-ion secondary batteries, and other additives, etc., as necessary. Such binders include various polymer materials. For example, when forming the negative electrode active material layer with an aqueous liquid-form composition (a composition using water or a solvent mixture primarily comprising water as the dispersion medium for active material particles), a polymer material soluble or dispersible in water can be preferably used as the binder. Examples of water-soluble polymer materials include cellulose-based polymers such as carboxymethyl cellulose (CMC), methyl cellulose (MC), cellulose acetate phthalate (CAP), hydroxypropyl methylcellulose (HPMC), hydroxypropyl methylcellulose phthalate (HPMCP), etc.; polyvinyl alcohol (PVA) and the like. Examples of water-dispersible polymer materials include fluorine-based resins such as polytetrafluoroethylene (PTFE), tetrafluorethylene-perfluoroalkyl vinyl ether copolymers (PFA), tetrafluoroethyl-hexafluoropropylene copolymers (FEP), ethylene-tetrafluoroethylene copolymers (ETFE), etc.; vinyl acetate copolymers; rubbers such as styrene-butadiene block rubber (SBR), acrylic acid-modified SBR resins (SBR-based latexes), gum arabic, etc.; and the like. Alternatively, when forming the negative electrode active material layer with a solvent-based liquid-form composition (a composition primarily using an organic solvent as the dispersion medium for the active material particles), can be used a polymer material such as polyvinylidene fluoride (PVDF), polyvinylidene chloride (PVDC), polyethylene oxide (PEO), polypropylene oxide (PPO), polyethylene oxide-propylene oxide copolymers (PEO-PPO), etc. The polymer materials exemplified above may also be used to work as a thickener or other additive in the negative electrode active material layer-forming composition, in addition to working as a binder.

The amounts of these additives contained in the negative electrode active material layer are not particularly limited while they are preferably about 1% by mass to 10% by mass (e.g. about 1% by mass to 5% by mass, typically 1% by mass to 3% by mass).

The method for fabricating the negative electrode such one as described above is not particularly limited, and conventional methods can be employed. For instance, it can be fabricated by the following methods. Firstly, a negative electrode active material is mixed with the suitable solvent (an aqueous solvent, an organic solvent or a solvent mixture of these) along with a binder, etc., to prepare a paste-form or slurry negative electrode active material layer-forming composition (or a paste-form composition, hereinafter). The paste-form composition thus prepared is applied to a negative current collector, allowed to dry by evaporating the solvent, and compressed. By this, a negative electrode for the lithium-ion secondary battery can be obtained having a negative electrode active material layer formed with the paste-form composition on a negative current collector. The mixing, application (coating), drying and compression can be carried out by conventionally-known means, similarly to the method for fabricating the positive electrode described earlier.

In a negative electrode fabricated as described above, for example, although the basis weight (coating weight based on the solid content in the negative electrode active material layer-forming composition) of the negative electrode active material layer per unit surface area of the negative current collector is not particularly limited as long as sufficient conductive channels (conductive pathways) are obtained. It is preferably 2.5 mg/cm$^2$ or more (e.g. 3 mg/cm$^2$ or more, typically 5 mg/cm$^2$ or more), but 50 mg/cm$^2$ or less (e.g. 25 mg/cm$^2$ or less, typically 15 mg/cm$^2$ or less).

The positive electrode active material and negative electrode active material to be used satisfy a negative electrode active material's linseed oil absorption number B (mL/100 g) to positive electrode active material's DBP absorption number A (mL/100 g) ratio, B/A, of 1.27 to 1.79. The ratio B/A is preferably 130 or larger (e.g. 1.44 or large, typically 1.53 or larger), but 1.77 or smaller (e.g. 1.75 or smaller, typically 1.73 or smaller). With the ratio B/A being within this range, the resistance increase caused by repeated charging and discharging can be suppressed, in particular, the increase in internal resistance occurring when high-rate discharge is repeated can be suppressed. In other words, it is presumed that when high-rate discharge is repeated, a non-aqueous electrolyte solution having a high support salt concentration does not enter positive and negative electrodes and remains in regions outside the positive and negative electrodes in the battery case to make the support salt concentration in the non-aqueous electrolyte solution comparatively lower inside the positive and negative electrodes, resulting in a variance of the support salt concentration inside and outside the positive and negative electrodes. Under such circumstances, with the ratio B/A being in the range of 1.27 to 1.79, the affinity between the positive electrode active material and the non-aqueous electrolyte solution will have an optimized relative relationship with the affinity between the negative electrode active material and the non-aqueous electrolyte solution; as a result, it brings about a reduction (or elimination) in support salt concentration variance over the entire non-aqueous electrolyte solution inside and outside the positive and negative electrodes, and works to suppress the increase in internal resistance occurring when high-rate discharge is repeated.

It is also preferable that the DBP absorption number A (mL/100 g) of the positive electrode active material and the linseed oil absorption number B (mL/100 g) of the negative electrode active material add to a total A+B of 87 (mL/200 g) or greater (e.g. 91 or greater, typically 93 or greater, but 130 or smaller). With the A+B being within this range, as long as the affinity between the positive electrode active material and the non-aqueous electrolyte solution satisfies a suitable relative relationship with the affinity between the negative electrode active material and the non-aqueous electrolyte solution, the affinity among the positive electrode active material, the negative electrode active material and the non-aqueous electrolyte solution will further increase, resulting in preferable suppression of the resistance increase caused by repeated charging and discharging, in particular, the internal resistance increase in the non-aqueous electrolyte secondary battery occurring when high-rate discharge is repeated.

It is also preferable that the positive electrode active material layer and the negative electrode active material layer are formed so that when the positive electrode active material contained in the positive electrode active material layer has a total mass C and the negative electrode active material contained in the negative electrode active material layer has a total mass D in the non-aqueous electrolyte secondary batty, the ratio C:D is about 90:10 to 10:90 (e.g. 70:30 to 30:70, typically 65:35 to 50:50). This allows the affinity among the positive electrode active material, the negative electrode active material and the non-aqueous electrolyte solution to be in a more suitable range in the relative relationship among these active materials; and as a result, the resistance increase caused by repeated charging and discharging is preferably suppressed, in particular, the internal resistance increase occurring when high-rate discharge is repeated is preferably suppressed.

With respect to construction of a lithium-ion secondary battery using the positive electrode sheet and the negative electrode sheet thus fabricated, a rough scheme is described. While referencing to FIG. 1 and FIG. 2, the positive electrode sheet 30 and negative electrode sheet 40 fabricated above are layered and wound along with two separator sheets 50, compressed and squashed from the layering direction to form the wound electrode body 20 into a flat shape. The resulting wound electrode body 20 is placed into a battery case 10 made of, for instance, metal or laminated film, and after an electrolyte solution is injected, the lid 14 is attached to the case opening 12 and sealed. Lithium-ion secondary battery 100 can be constructed in such a manner.

Preferable examples of a separator (separator sheet) used between the positive and negative electrodes include those formed of porous polyolefin-based resins. For example, can be preferably used an approximately 5 μm to 30 μm thick porous separator sheet made of a synthetic resin (e.g. polyethylene, polypropylene, or a polyolefin having a constitution combining two or more layers of these). The separator sheet may be provided with a heat-resistant layer, etc. When using, for instance, an electrolyte such as a solid-form (gel-form) electrolyte obtained by adding a polymer to such an electrolyte solution, etc., in place of the electrolyte solution, separators may be unnecessary (i.e. in this case, the electrolyte itself can serve as the separator).

For the electrolyte solution, non-aqueous electrolyte solutions conventionally used in lithium-ion secondary batteries can be used without particular limitations. Such a non-aqueous electrolyte solution typically has a composition containing a support salt in a suitable non-aqueous solvent. Examples of the non-aqueous solvent include ethylene carbonate (EC), propylene carbonate (PC), diethyl carbonate (DEC), dimethyl carbonate (DMC), ethyl methyl carbonate (EMC), 1,2-dimethoxyethane, 1,2-diethoxyethane tetrahydrofuran, 2-methyltetrahydrofuran, dioxane, 1,3-dioxolane, diethylene glycol dimethyl ether, ethylene glycol dimethyl ether, acetonitrile, propionitrile, nitromethane, N,N-dimethylformamide, dimethylsulfoxide, sulfolane, γ-butyrolactone, etc., among which solely one species or a mixture of two or more species can be used. In particular, can be preferably used one, two or more species selected from a group consisting of ethylene carbonate (EC), propylene carbonate (PC), dimethyl carbonate (DMC), diethyl carbonate (DEC), ethyl methyl carbonate (EMC) and N,N-dimethylfomamide (DMF).

As the support salt, for example, can be used one, two or more species of lithium compound (lithium salt) such as $LiPF_6$, $LiBF_4$, $LiClO_4$, $LiAsF_6$, $LiCF_3SO_3$, $LiC_4F_9SO_3$, $LiN(CF_3SO_2)_2$, $LiC(CF_3SO_2)_3$, LiI, etc. The support salt concentration can be similar to those of non-aqueous electrolyte solutions used in conventional lithium-ion secondary batteries while not particularly limited. A non-aqueous electrolyte solution containing a suitable lithium compound (support salt) at a concentration of about 0.1 mol/L to 5 mol/L (e.g. 0.5 mol/L to 3 mol/L, typically 0.8 mol/L to 1.5 mol/L) can be used.

Figure 4:
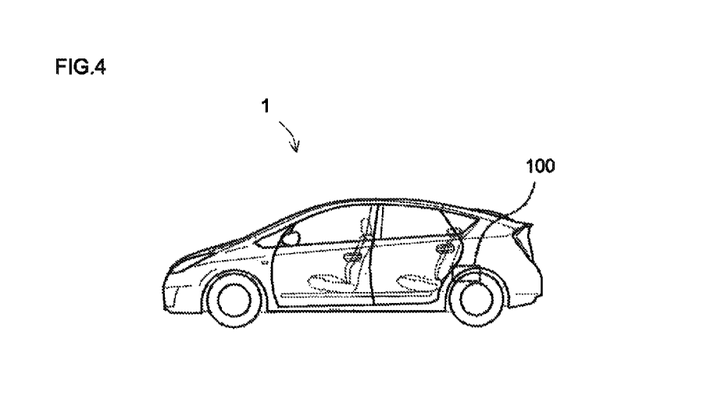
FIG. 4 shows a side view schematically illustrating a vehicle (automobile) comprising a lithium-ion secondary battery according to an embodiment.

As described above, in a lithium-ion secondary battery constructed in such a manner, the resistance increase caused by repeated charging and discharging is suppressed, thus it can be preferably used in particular as a motor (electric motor) power supply loaded on vehicles such as automobiles. Accordingly, as shown in FIG. 4, the present invention provides a vehicle 1 (typically an automobile, especially an automobile comprising an electric motor, such as hybrid automobiles, electric automobiles, fuel-cell automobiles) comprising such a lithium-ion secondary battery 100 (typically a multi-battery system obtainable by serially connecting several batteries) as a power supply.

Several embodiments relevant to the present invention are described below although this is not to limit the present invention to these worked examples. In the following description, the terms "parts" and "%" are based on the mass unless specifically stated otherwise.

Example 1 to Example 21

(1) Fabrication of Positive Electrode Sheet

As positive electrode active materials, several species of lithium nickel manganese cobalt oxide ($LiNi_{1/3}Mn_{1/3}Co_{1/3}O_2$) powder were obtained. With respect to each positive electrode active material, the DBP absorption number was measured based on the measurement method described earlier. Each positive electrode active material obtained exhibiting the DBP absorption number shown in Table 1, acetylene black as a conductive material and carboxymethyl cellulose (CMC) as a binder were mixed at a mass ratio of these materials of 88:10:2 in ion-exchanged water to prepare a paste-form positive electrode active material layer-forming composition. This composition was applied evenly to each face of a long sheet of aluminum foil (15 μm thick) to a total basis weight of 16.8 mg/cm² (based on solid content), allowed to dry, and then pressed to form a positive electrode active material layer on the positive current collector, whereby a sheet of positive electrode (positive electrode sheet) was fabricated.

(2) Fabrication of Negative Electrode Active Material

As negative electrode active materials, several species of natural graphite powder were obtained. With respect to each negative electrode active material, the linseed oil absorption number was measured based on the measurement method described earlier. Each negative electrode active material obtained exhibiting the linseed absorption number shown in Table 1, styrene-butadiene copolymer (SBR) as a binder and carboxymethyl cellulose (CMC) as a thickener were mixed in ion-exchanged water at a ratio of these material of 98:1:1 to prepare a paste-form negative electrode active material layer-forming composition. This composition was applied evenly to each face of a long sheet of copper foil (10 μm thick) to a total basis weight of 9.6 mg/cm² (based on solid content), allowed to dry, and then pressed to form a negative electrode active material layer on the negative current collector, whereby a sheet of negative electrode (negative electrode sheet) was fabricated.

(3) Construction of Lithium-Ion Secondary Battery

The respective positive electrode sheet and negative electrode sheet fabricated were layered along with two long sheets of polyolefin-based separator (herein, 25 μm thick porous polyethylene sheets were used), and the layered sheets were wound in the length direction to fabricate a wound electrode body. The wound electrode body was placed in a cylindrical container along with an electrolyte solution to construct a lithium-ion secondary battery (theoretical capacity 223 mAh) according to each of Example 1 to Example 21. As the electrolyte solution, was used a solution containing approximately 1 mol/L of $LiPF_6$ as the support salt dissolved in a solvent mixture of ethylene carbonate (EC), dimethyl carbonate (DMC) and ethyl methyl carbonate (EMC) at 3:3:4 (mass ratio). In each of the resulting lithium-ion secondary batteries, the total mass of the positive electrode active material contained in the positive electrode active material layer and the total mass of the negative electrode active material contained in the negative electrode active material layer was each at a ratio of 61:39.

[Resistance Increase Rate by High-Rate Cycling]

Figure 6:
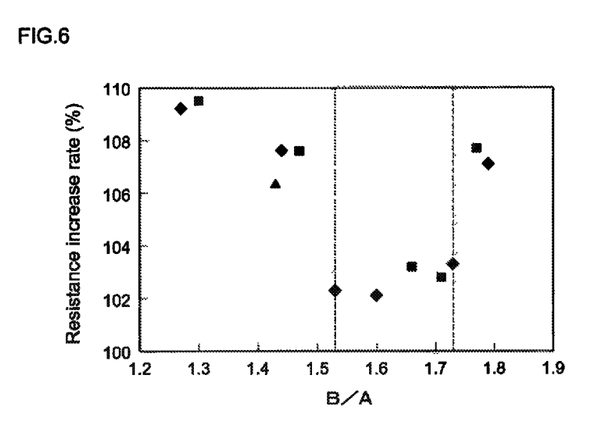
FIG. 6 shows the graph in FIG. 5, enlarged to show the range where the negative electrode active material's linseed oil absorption number B (mL/100 g) to positive electrode active material's DBP absorption number A (mL/100 g) ratio B/A is in a range of 127 to 1.79.
Figure 7:
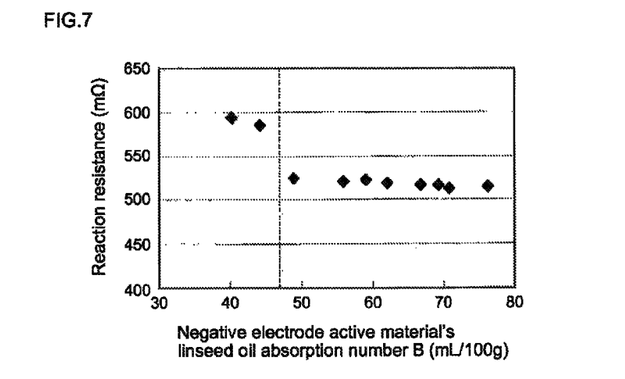
FIG. 7 shows a graph indicating the relationship between the negative electrode active material's linseed oil absorption number B (m/100 g) and the reaction resistance (mΩ).
Figure 8:
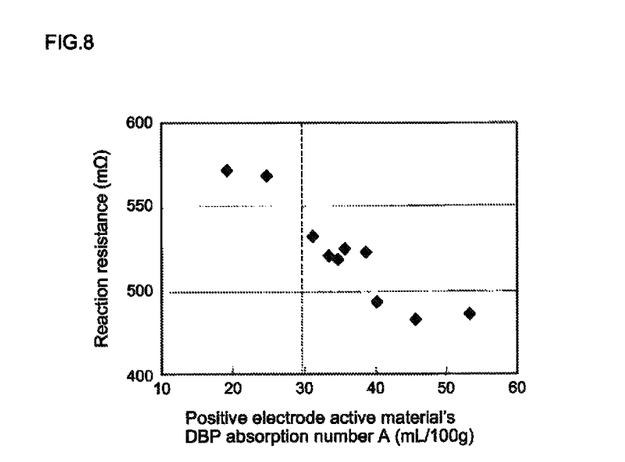
FIG. 8 shows a graph indicating the relationship between the positive electrode active material's DBP absorption number A (mL/100 g) and the reaction resistance (mΩ).
Figure 9:
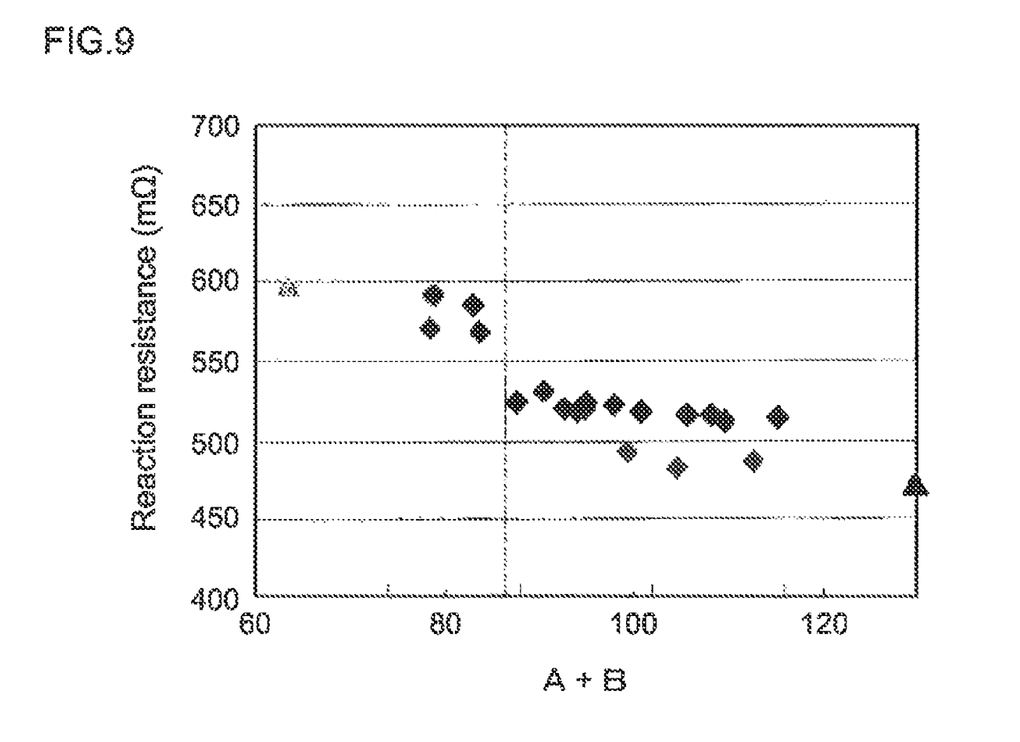
FIG. 9 shows a graph of the total A+B (mL/200 g) of the positive electrode active material's DBP absorption number A (mL/100 g) and the negative electrode active material's the linseed oil absorption number B (mL/100 g) in relation to the reaction resistance (mΩ).

Each lithium-ion secondary battery fabricated above was adjusted to 60% SOC (state of charge) and discharged at a constant current rate of 30 C at a temperature of −15° C., and from the voltage drop, the initial reaction resistance (mΩ) was determined. Subsequently, each lithium-ion secondary battery was adjusted again to 60% SOC, and at a temperature of −15° C., subjected to a high-rate cycling test repeating 3000 charge/discharge cycles, with each cycle consisting of the following (I) to (IV):

(I) discharging at a constant rate of 30 C for 10 seconds (II) giving a 10 minute break (III) charging at a constant rate of 5 C for one minute (IV) giving a 10 minute break During this test, after every 100 cycles, the SOC was adjusted to 60%. With respect to each lithium-ion secondary battery after the test, in the same manner as the initial reaction resistance measurement, the reaction resistance (mΩ) after the high-rate cycling was measured. By dividing the reaction resistance value after the high-rate cycling by the initial reaction resistance value, the resistance increase rate (%) due to the high-rate cycling was determined. The resistance increase rates (%) due to the high-rate cycling are shown in Table 1, FIG. 5 and FIG. 6 while the reaction resistance values (mΩ) after the high-rate cycling are shown in FIG. 7 to FIG. 9.

TABLE 1

| | Positive electrode active material Oil absorption number A (mL/100 g) | Negative electrode active material Oil absorption number B (mL/100 g) | B/A | A + B | High-rate cycling resistance increase rate (%) |
|---|---|---|---|---|---|
| Ex. 1 | 38.7 | 40.1 | 1.04 | 78.8 | 127.7 |
| Ex. 2 | 38.7 | 44.2 | 1.14 | 82.9 | 124.8 |
| Ex. 3 | 38.7 | 49.0 | 1.27 | 87.7 | 109.2 |
| Ex. 4 | 38.7 | 55.8 | 1.44 | 94.5 | 107.6 |
| Ex. 5 | 38.7 | 59.2 | 1.53 | 97.9 | 102.3 |
| Ex. 6 | 38.7 | 62.1 | 1.60 | 100.8 | 102.1 |
| Ex. 7 | 38.7 | 66.8 | 1.73 | 105.5 | 103.3 |
| Ex. 8 | 38.7 | 69.4 | 1.79 | 108.1 | 107.1 |
| Ex. 9 | 38.7 | 70.9 | 1.83 | 109.6 | 114.5 |
| Ex. 10 | 38.7 | 76.3 | 1.97 | 115.0 | 128.2 |
| Ex. 11 | 19.2 | 59.2 | 3.08 | 78.4 | 188.9 |
| Ex. 12 | 24.6 | 59.2 | 2.41 | 83.8 | 170.7 |
| Ex. 13 | 31.2 | 59.2 | 1.90 | 90.4 | 118.3 |
| Ex. 14 | 33.4 | 59.2 | 1.77 | 92.6 | 107.7 |
| Ex. 15 | 34.6 | 59.2 | 1.71 | 93.8 | 102.8 |
| Ex. 16 | 35.7 | 59.2 | 1.66 | 94.9 | 103.2 |
| Ex. 17 | 40.2 | 59.2 | 1.47 | 99.4 | 107.6 |
| Ex. 18 | 45.5 | 59.2 | 1.30 | 104.7 | 109.5 |
| Ex. 19 | 53.3 | 59.2 | 1.11 | 112.5 | 120.9 |
| Ex. 20 | 19.2 | 44.2 | 2.30 | 63.4 | 139.9 |
| Ex. 21 | 53.3 | 76.3 | 1.43 | 129.6 | 106.3 |

Figure 5:
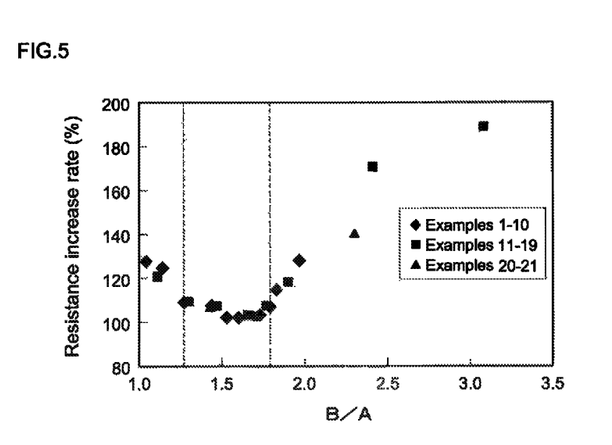
FIG. 5 shows a graph indicating the relationship between the negative electrode active material's linseed oil absorption number B (mL/100 g) to positive electrode active material's DBP absorption number A (mL/100 g) ratio B/A and the resistance increase rate (%).

As shown in Table 1 and FIG. 5, with respect to the lithium-ion secondary batteries according to Examples 3-8, 14-18 and 21 with each having a negative electrode active material's linseed oil absorption number B (mL/100 g) to positive electrode active material's DBP absorption number A (mL/100 g) ratio B/A of 1.27 to 1.79, the resistance increase rate due to the high-rate cycling (3000 cycles) at −15° C. was below 110% for each. On the other hand, with respect to the lithium-ion secondary batteries according to Examples 1, 2, 9-13, 19 and 20 each having a ratio B/A below 1.27 or above 1.79, the resistance increase rate due to the high-rate cycling was higher than 114%. Accordingly, it can be said that by adjusting the ratio B/A within the range of 1.27 to 1.79, it is possible to suppress the internal resistance increase in the lithium-ion secondary battery occurring when high-rate discharge is repeated.

As shown in Table 1 and FIG. 6, with respect to the lithium-ion secondary batteries according to Examples 5-7, 15 and 16 with each having a ratio B/A of 1.53 to 1.73, the resistance increase rate due to the high-rate cycling was below 104%. This indicates that it is possible to significantly suppress the internal resistance increase in the lithium-ion secondary battery occurring when high-rate discharge is repeated.

As shown in Table 1 and FIG. 7, with respect to the lithium-ion secondary batteries according to Examples 1, 2 and 20 with each having a negative electrode active material's linseed oil absorption number B smaller than 45 mL/100 g, the resistance increase rate due to the high-rate cycling exceeded 124%. From these results, it can be said that with use of a negative electrode active material having a linseed oil absorption number B of 45 mL/100 g or greater, it is possible to suppress the internal resistance increase in the lithium-ion secondary battery occurring when high-rate discharge is repeated.

As shown in Table 1 and FIG. 8, with respect to the lithium-ion secondary batteries according to Examples 11, 12 and 20 with each having a positive electrode active material's DBP absorption number A smaller than 25 mL/100 g, the resistance increase rate due to the high-rate cycling exceeded 139%. From these results, it can be said that with use of a positive electrode active material having a DBP absorption number A of 25 mL/100 g or greater, it is possible to suppress the internal resistance increase in the lithium-ion secondary battery occurring when high-rate discharge is repeated.

As shown in Table 1 and FIG. 9, with respect to the lithium-ion secondary batteries according to Examples 1, 2, 11, 12 and 20 with each having a positive electrode active material's DBP absorption number A (mL/100 g) and a negative electrode active material's linseed oil absorption number B (mL/100 g) adding to a total A+B smaller than 87 (mL/200 g), the resistance increase rate due to the high-rate cycling exceeded 124%. From these results, with the A+B being set at 87 (mL/200 g) or greater, it is possible to suppress the internal resistance increase in the lithium-ion secondary battery occurring when high-rate discharge is repeated.

The invention claimed is:

1. A non-aqueous electrolyte secondary battery comprising:
    a positive electrode having a positive electrode active material layer comprising a positive electrode active material as a primary component; and
    a negative electrode having a negative electrode active material layer comprising a negative electrode active material as a primary component; and
    a ratio B/A is 1.27 to 1.79, the ratio B/A being a ratio of negative electrode active material's linseed oil absorption number B (mL/100 g) to positive electrode active material's DBP absorption number A (mL/100 g).

2. The non-aqueous electrolyte secondary battery according to claim 1, wherein the ratio B/A is 1.53 to 1.73.

3. The non-aqueous electrolyte secondary battery according to claim 1, wherein the DBP absorption number A of the positive electrode active material is 25 mL/100 g or greater.

4. The non-aqueous electrolyte secondary battery according to claim 1, wherein the linseed oil absorption number B of the negative electrode active material is 45 mL/100 g or greater.

5. The non-aqueous electrolyte secondary battery according to claim 1, wherein a total A B is 87 (mL/200 g) or greater, A being the DBP absorption number A (mL/100 g) of the positive electrode active material and B being the linseed oil absorption number B (mL/100 g) of the negative electrode active material.

6. The non-aqueous electrolyte secondary battery according to claim 1, the battery being constructed as a lithium-ion secondary battery, wherein the positive electrode active material is a lithium transition metal oxide comprising, as a constituent atom, at least one species of nickel, cobalt and manganese, and the negative electrode active material is graphite.

7. A vehicle comprising the non-aqueous electrolyte secondary battery according to claim 1.

* * * * *